United States Patent
Iimori et al.

(12) 
(10) Patent No.: US 6,405,499 B1
(45) Date of Patent: Jun. 18, 2002

(54) PANEL ATTACHING STRUCTURE FOR VEHICLES

(75) Inventors: Yasushi Iimori; Akira Kose, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/569,908

(22) Filed: May 11, 2000

(30) Foreign Application Priority Data

May 14, 1999 (JP) ............................................. 11-134511

(51) Int. Cl.[7] ................................................. E06B 3/54
(52) U.S. Cl. ................................. 52/204.597; 52/204.62
(58) Field of Search ...................... 52/204.591, 204.597, 52/204.62, 204.67; 296/84.1, 90, 93

(56) References Cited

U.S. PATENT DOCUMENTS 4,165,119 A * 8/1979 Hedeen et al. ......... 52/204.597
4,787,187 A * 11/1988 Feldmann ............... 52/204.597
5,480,207 A * 1/1996 Gold ...................... 52/204.591

FOREIGN PATENT DOCUMENTS

| JP | 62-84521 | 5/1987 |
| JP | 62-199525 | 9/1987 |
| JP | 05-213072 | 8/1993 |

\* cited by examiner

*Primary Examiner*—Michael Safavi
(74) *Attorney, Agent, or Firm*—Woodcock Washburn LLP

(57) ABSTRACT

A panel is attached to a panel frame such that the panel is movable relative to the panel frame. A weather strip is attached to the frame to seal the periphery of the panel. A gap is defined between the end of the panel and an adjacent inner wall of the weather strip. Cohesive elastic material is located in the gap. The panel end face is inclined by an acute angle relative to the upper surface of the panel such that the gap widens in the downward direction. When compressed and deformed between the end of the panel and the inner wall of the weather strip, the elastic material is pressed downward, which prevents the elastic material from bulging upward and spoiling the appearance of the weather strip.

11 Claims, 6 Drawing Sheets

PANEL ATTACHING STRUCTURE FOR VEHICLES

BACKGROUND OF THE INVENTION

The present invention relates to a structure for supporting a panel such as a panel of a vehicle sunroof.

Some vehicles, particularly some automobiles, have a sunroof located in the ceiling to light the passenger compartment and to create a sense of openness. As shown in FIG. 9, a sunroof 100 includes a panel 20 made of glass or synthetic resin.

As shown in FIG. 10, the panel 20 is attached to a metal panel frame 10 by adhesive 40. The adhesive 40 permits the panel 20 to move relative to the panel frame 10. A weather strip 30 is located between the panel frame 10 and the panel 20. The weather strip 30 includes an upper lip 32. The upper lip 32 contacts a relatively large area of the upper surface 20a to seal the periphery of the panel 20.

If the panel 20 is made of resin, the difference of coefficient of linear expansion between the panel 20 and the panel frame 10, which is made of metal, is greater than the difference of coefficient of linear expansion between the metal panel frame 10 and a panel made of glass, which causes the following drawbacks. When the temperature is high, a heat expansion of the panel 20 presses the end face 20c of the panel 20 against the inner wall 30a of the adjacent weather strip 30. This damages the weather strip 30.

When the temperature is low, the panel 20 contacts, which causes the end face 20c of the panel 20 to separate from the inner wall 30a of the weather strip 30 and creates a cavity. The upper lip 32 of the weather strip 30 merely contacts the upper surface 20a of the panel 20. Therefore, when washing or cleaning the vehicle body, water or chemical liquid such as detergent and wax may enter the cavity between the upper lip 32 and the upper surface 20a. Water or other liquids in the cavity reaches the frame 10 and corrodes the surface of the frame 10.

Japanese Unexamined Patent Publication No. 62-199525 discloses a structure shown in FIG. 11. The structure of FIG. 11 has a cavity Sb between the panel end face 20c and the inner wall 30a of the weather strip 30. The cavity Sb prevents the end face 20c from interfering with the inner wall 30a due to thermal expansion of the panel 20. However, this structure cannot prevent liquids from entering the cavity Sb between the upper lip 32 and the upper surface 20a.

The publication No. 62-199525 also discloses a structure shown in FIG. 12. The structure of FIG. 12 includes an elastic and cohesive sealant 70 filling the cavity between the panel end face 20c and the inner wall 30a of the weather strip 30. The sealant 70 prevents water or chemical liquid from reaching the frame 10.

The panel end face 20c is parallel to the inner wall 30a of the weather strip 30. Therefore, when the panel 20 thermally expands, the panel 20 pushes the sealant 70, which may bulge the sealant 70 as shown by broken line 70a, and, in some cases, may shear the sealant 70. When the panel 20 thermally contracts, tension is applied to the sealant 70, which fractures the sealant 70 or separates the sealant 70 from the panel end face 20c. This lowers the effectiveness of the sealant 70. As a result, liquid can reach the frame 10. In other words, the sealant 70 cannot completely prevent corrosion of the frame 10. When the panel 20 thermally expands, the bulge 70a of the sealant 70 raises the upper lip 32 as shown by a broken line 32a, which spoils the appearance of the weather strip 30.

SUMMARY OF THE INVENTION

Accordingly, it is an objective of the present invention to provide a panel attaching structure that prevents the panel end face from interfering with a member facing the end face and has an improved sealing effectiveness.

To achieve the foregoing and other objective and in accordance with the purpose of the present invention, a panel attaching structure is provided. The structure includes a generally horizontal frame, a panel supported on the frame. The panel includes an upper surface, a lower surface and an end surface. The structure also a weather strip and an opposing surface facing the end surface. The weather strip contacts the upper surface to seal the periphery of the panel. A gap is defined between the opposing surface and the end surface. The gap becomes wider in a downward direction. A cohesive elastic material located in the gap.

The present invention may be embodied in another panel attaching structure. The structure includes a generally horizontal frame and a panel supported on the frame to move relative to the frame. The panel includes an upper surface, a lower surface and an end surface. The structure also includes a weather strip attached to the frame, an opposing surface facing the end surface and a diverting mechanism. The weather strip includes an upper lip, which contacts the upper surface to seal the periphery of the panel. A gap is defined between the opposing surface and the end surface. A cohesive elastic material is located in the gap. When the elastic material is compressed and deformed between the end surface and the opposing surface, the diverting mechanism pushes the elastic material in a downward direction.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
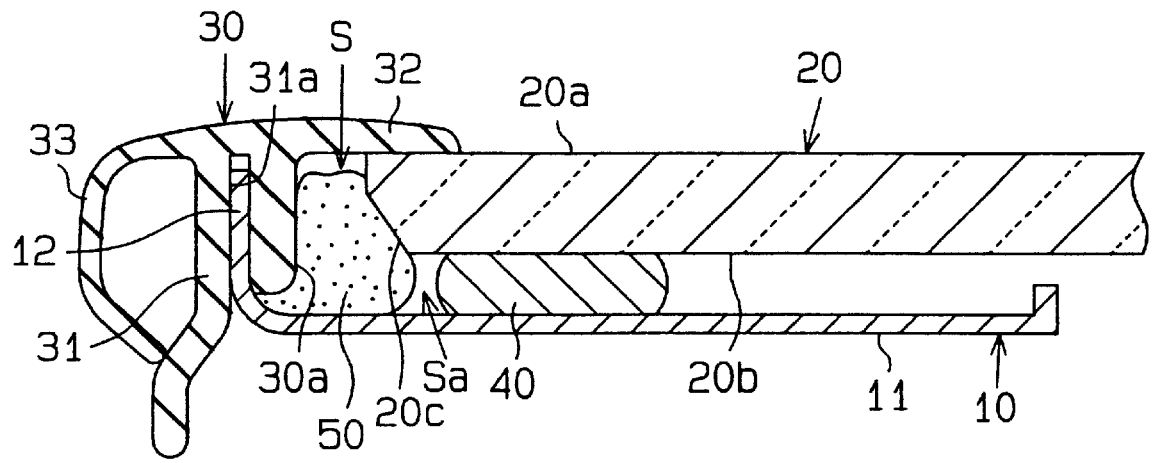
FIG. 1 is a partial cross-sectional view showing a sunroof according to a first embodiment of the present invention.

A first embodiment of the present invention will now be described with reference to FIGS. 1 to 4. The differences from the prior art sunroofs shown in FIGS. 9 to 12 will mainly be discussed below, and like or the same reference numerals are given to those components that are like or the same as the corresponding components of the prior art sunroofs of FIGS. 9 to 12. A sunroof 1 is located in an opening formed in a ceiling of a vehicle body. The sunroof 1 opens and closes the opening.

As shown in FIG. 1, the sunroof 1 includes a rectangular panel frame 10, a rectangular panel 20 and a weather strip 30. The frame 10 includes a substantially flat main plate 11 and a flange 12. The flange 12 is formed by bending the periphery of the plate 11 upward. The panel frame 10 is made of metal such as iron.

The panel 20 is located on the panel frame 10 and is surrounded by the flange 12. The panel 20 is made of resin such as polymethylmetacrylate resin, acrylic resin or polycarbonate resin. A protection coat layer (not shown) is formed on each of upper and lower surfaces 20a, 20b of the panel 20.

The lower surface 20b of the panel 20 is adhered to the upper surface of the main plate 11 by a cohesive, elastic adhesive 40. The adhesive 40 is located between the panel 20 and the main plate 11 at a location inside the end face 20c of the panel 20. The adhesive 40 is preferably an elastic material such as semi-curing adhesive. The adhesive 40 permits the panel 20 to move relative to the panel frame 10.

A weather strip 30 includes a base 31, an upper lip 32 and an outer lip 33. The upper lip 32 extends inward from the upper end of the base 31, and the outer lip 33 extends outward from the upper end of the base 31. The base 31 has a groove 31a for receiving the flange 12 of the frame 10. The upper lip 32 contacts a relatively large area of the upper surface 20a of the panel 20. The outer lip 33 is bent to define a space with the base 31 and is closely fitted to the inner wall of the opening. The weather strip 30 is made of solid rubber such as ethylene propylene rubber or chloroprene rubber. Alternatively, the weather strip 30 may be made of soft vinyl chloride resin.

The weather strip 30 is attached to the panel frame 10 by fitting the flange 12 in the groove 31a of the base 31. Accordingly, the upper lip 32 elastically contacts the upper surface 20a of the panel 20. Therefore, the upper lip 32 effectively seals the space between the upper surface 20a and the flange 12.

Figure 2:
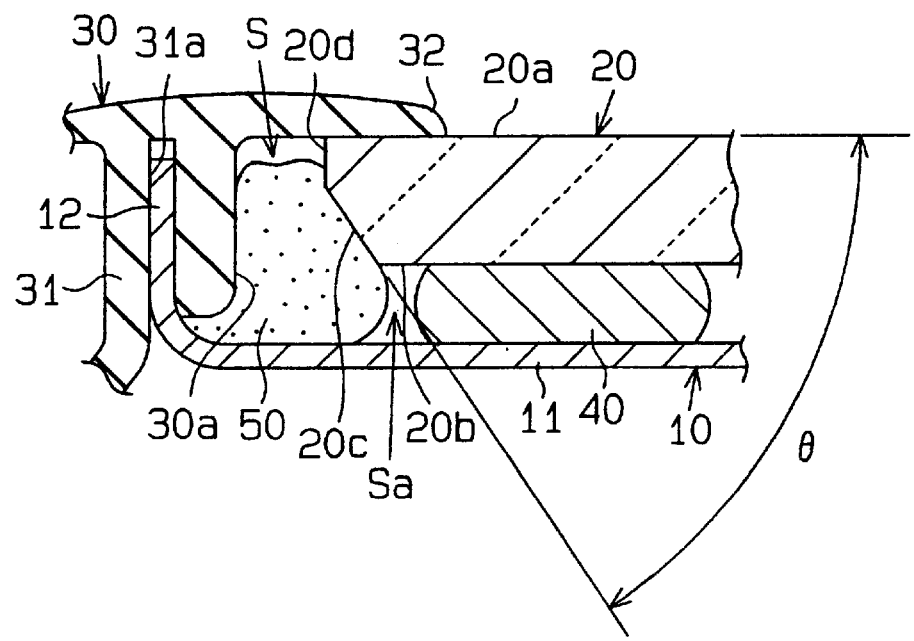
FIG. 2 is an enlarged partial cross-sectional view illustrating the sunroof of FIG. 1.
Figure 3:
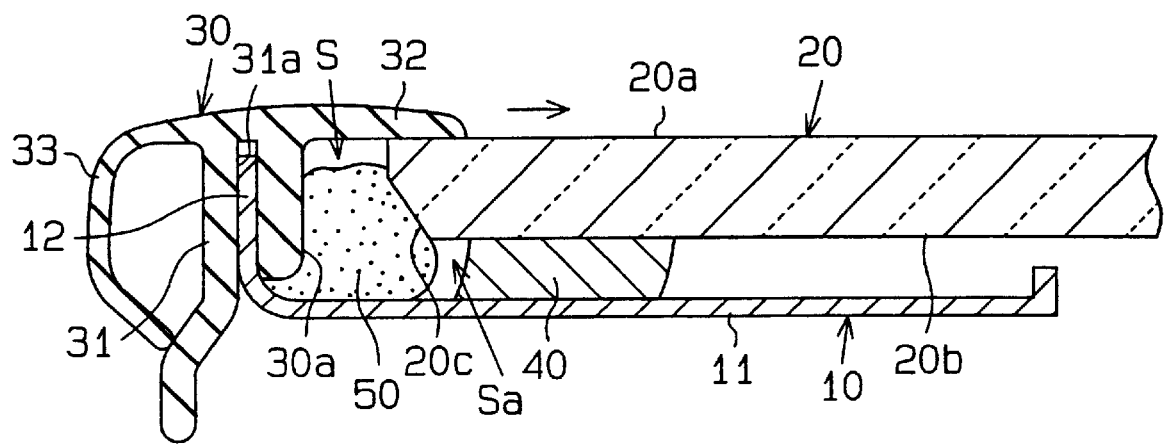
FIG. 3 a partial cross-sectional view showing the sunroof of FIG. 1 when the panel is thermally contracted.
Figure 4:
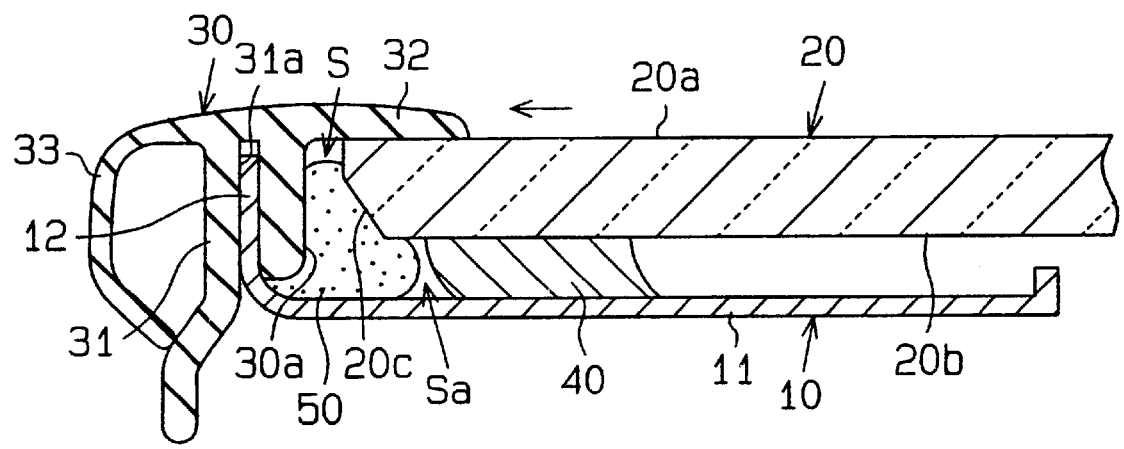
FIG. 4 is a partial cross-sectional view showing the sunroof of FIG. 1 when the panel is thermally expanded.

As shown in FIG. 2, there is a gap S between the end face 20c of the panel 20 and the adjacent inner wall 30a of the base 31. Elastic material 50 occupies much of the gap S. The elastic material 50 preferably has the following characteristics. The material 50 is preferably not highly stressed when compressed by the panel 20, when the panel 20 expands. When the panel 20 contracts, the panel 20 applies tension to the material 50. At this time, the material 50 preferably does not separate from the panel end face 20c or from the inner wall 30a of the weather strip 30, and the material 50 preferably does not fracture. These characteristics are satisfied by, for example, rubber hot-melt sealing.

The material 50 does not fill the entire gap S. There is an upper space (unnumbered) between the material 50 and the upper lip 32. There is a lower space Sa between the material 50 and the adhesive 40. These spaces, particularly, the lower space Sa, accommodate deformation of the material 50.

The end face 20c is inclined by an acute angle θ relative to the upper surface 20a. Thus, the gap S becomes wider toward the lower surface 20b of the panel 20. An upper part 20d of the panel end face 20c that is close to the panel upper surface 20a is substantially perpendicular to the upper surface 20a. If the entire end face 20c is inclined relative to the upper surface 20a, the end face 20c and the upper surface 20a will form a sharp and a fragile edge. The part 20d does not define a sharp edge between the end face 20c and the upper surface 20a, which prevents damage to the edge.

When the panel 20 thermally expands, the distance between the panel end face 20c and the inner wall 30a of the weather strip 30 decreases. At this time, the elastic material 50 is compressed to accommodate the heat expansion of the panel 20. The deformation of the material 50 prevents the panel end face 20c from contacting with the inner wall 30a by a great force.

When the panel 20 thermally contracts, the distance between the panel end face 20c and the inner wall 30a of the weather strip 30 increases. Due to its restoring force and cohesiveness, the elastic material 50 does not separate from the panel end face 20c and from the inner wall 30a. Therefore, if liquid enters the gap S between the lip 32 and the upper surface 20a during a car wash, the liquid is prevented from reaching the frame 10. Thus, corrosion of the frame 10 is inhibited.

The distance between the panel end face 20c and the inner wall 30a increases at locations nearer to the lower surface 20b. Thus, when compressed by the panel 20, the material 50 is pressed downward and enters the lower space Sa. In other words, when deformed by the panel 20, the material 50 is not moved upward or sheared. Thus, the sealing effectiveness of the material 50 is maintained for a long time. Since the material 50 does not push the upper lip 32 upward, the appearance of the weather strip 30 is not spoiled. The end face 20c functions as a diverting mechanism or as a diverting means for applying a downward force to the material 50 when the material 50 is compressed and deformed.

To increase the width of the gap S from the panel upper surface 20a to the panel lower surface 20b, the panel end face 20c is merely inclined relative to the upper surface 20a by an acute angle. Thus, machining of the panel end face 20c is simple and the costs are minimized.

Figure 5:
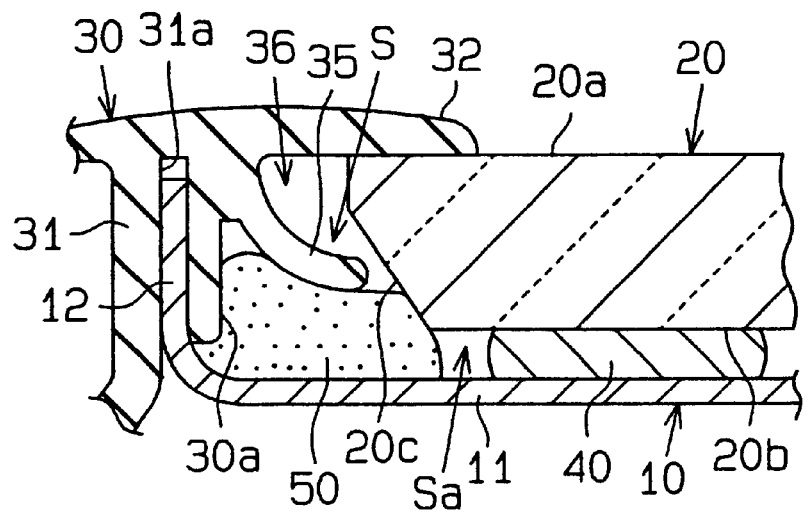
FIG. 5 is a partial cross-sectional view showing a sunroof according to a second embodiment of the present invention.

A second embodiment of the present invention will now be described with reference to FIG. 5. The differences from the embodiment of FIGS. 1 to 4 will mainly be discussed below. In the embodiment of FIG. 5, an inner lip 35 is integrally formed with the weather strip 30. The inner lip 35 extends from the inner wall 30a and presses on the elastic material 50. Specifically, the inner lip 35 extends toward the panel end face 20c in the gap S, which is defined between the panel end face 20c and the inner wall 30a. Since the inner lip 35 holds the material 50, a relatively large space 36 is defined between the inner lip 35 and the upper lip 32.

The inner lip 35 is moved in accordance with deformation of the end face 20c when the panel 20 expands and contracts. When the panel 20 thermally expands, the inner lip 35 holds the material 50 to prevent the material 50 from being deformed. Accordingly, upward deformation of the material 50 is effectively prevented.

Figure 6:
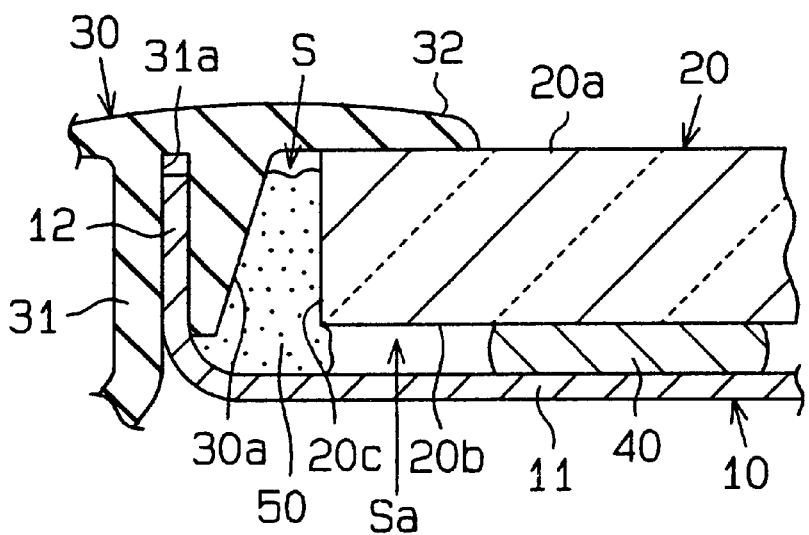
FIG. 6 is a partial cross-sectional view showing a sunroof according to a third embodiment of the present invention.

A third embodiment of the present invention will now be described with reference to FIG. 6. The differences from the embodiment of FIGS. 1 to 4 will mainly be discussed below. In the embodiment of FIG. 6, the panel end face 20c is substantially perpendicular to the panel upper surface 20a. However, the inner wall 30a of the weather strip 30 is inclined relative to the panel end face 20c. Therefore, as in the embodiment of FIGS. 1 to 4, the width of the gap S between the panel end face 20c and the inner wall 30a increases in the direction of the lower surface 20b of the panel 20.

The construction of FIG. 6 may be combined with the construction of FIGS. 1 to 4. That is, both the panel end face 20c and the inner wall 30a may be inclined.

Figure 7:
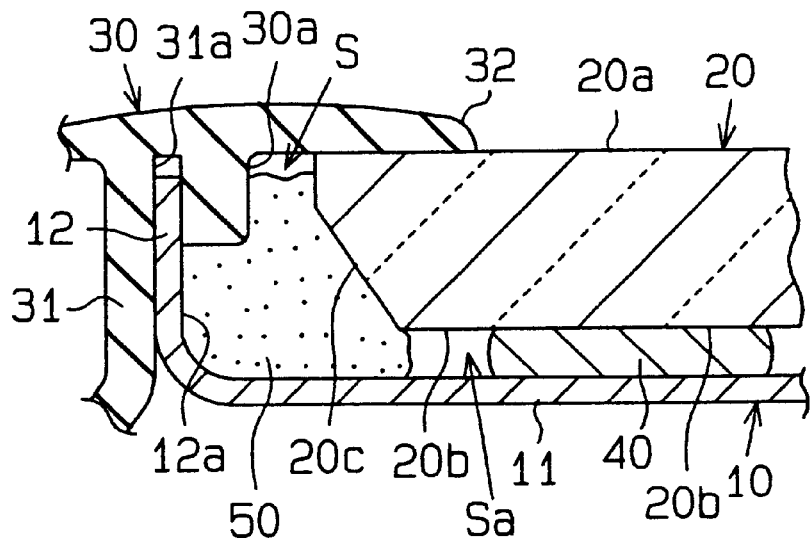
FIG. 7 is a partial cross-sectional view showing a sunroof according to a fourth embodiment of the present invention.

A fourth embodiment of the present invention will now be described with reference to FIG. 7. The differences from the embodiment of FIGS. 1 to 4 will mainly be discussed below. In the embodiment of FIG. 7, the vertical dimension of the weather strip 30 that faces the panel end face 20c is smaller than the corresponding dimension in FIGS. 1 to 4. Therefore, the weather strip 30 and the flange 12 of the panel frame 10 face the panel end face 20c. In other words, the inner wall 30a of the weather strip 30 and the inner wall 12a of the flange 12 face the panel end face 20c.

The weather strip 30 may be formed such that only flange 12 faces the panel end face 20c. In this case, the angle defined by the flange 12 and the main plate 11 may be an acute angle so that the width of the gap S increases in the downward direction.

Figure 8:
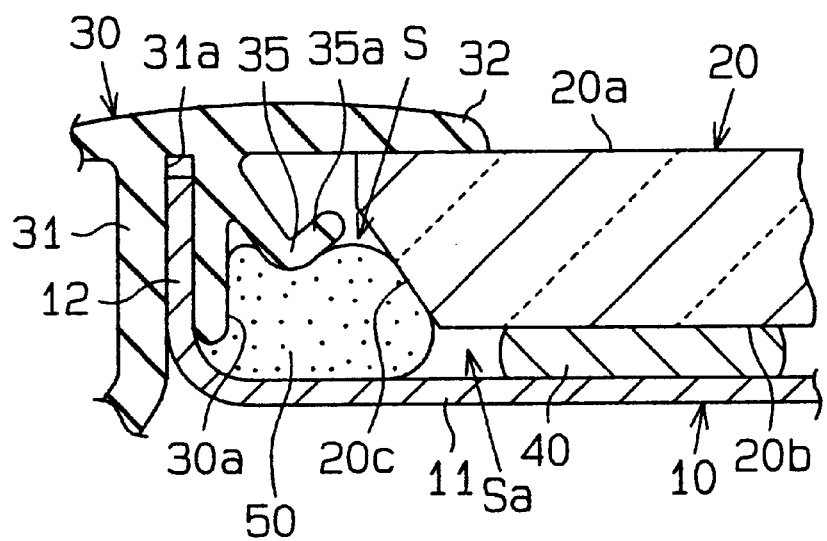
FIG. 8 is a partial cross-sectional view showing a sunroof according to a fifth embodiment of the present invention.
Figure 9:
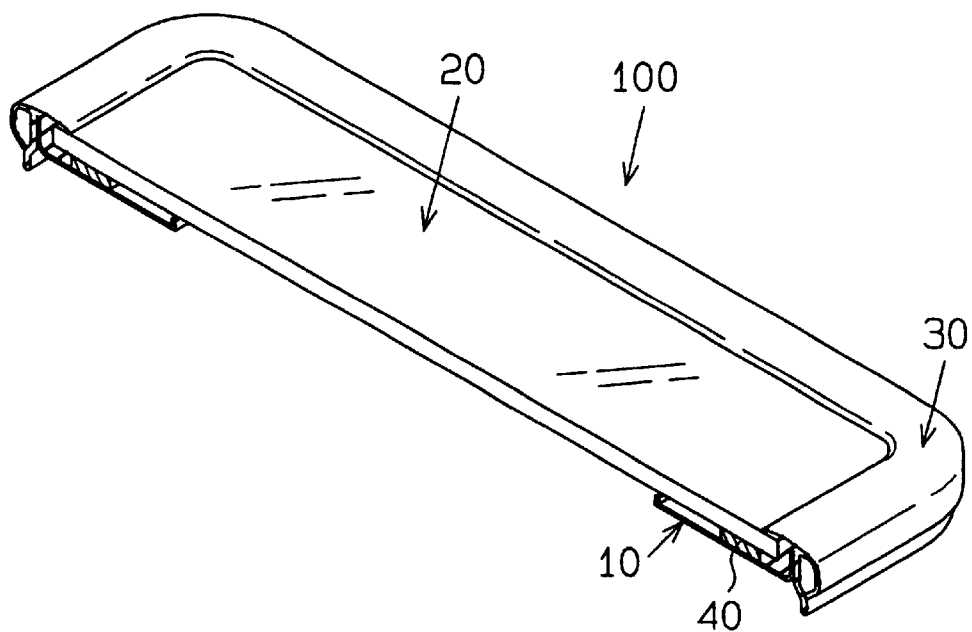
FIG. 9 is a perspective view, with a part cut away, illustrating a prior art sunroof.
Figure 10:
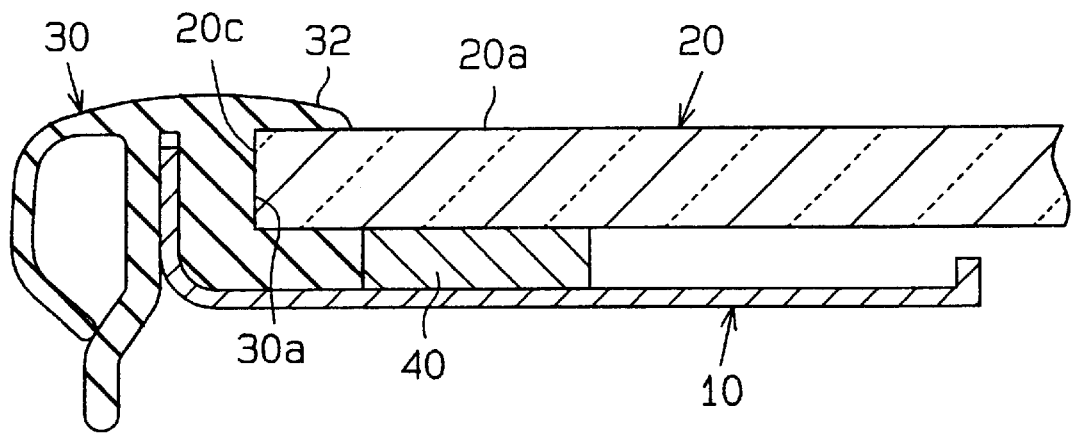
FIG. 10 is a partial cross-sectional view showing the sunroof of FIG. 9.
Figure 11:
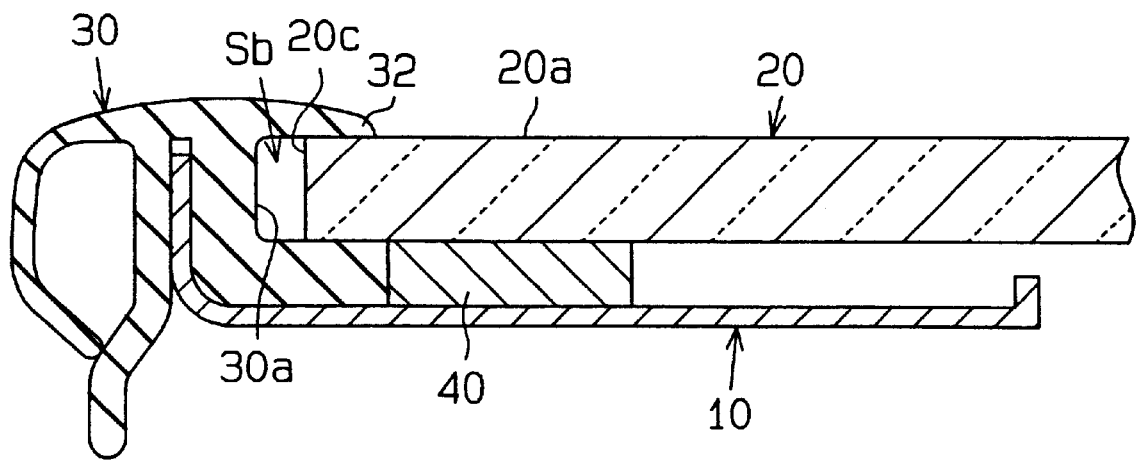
FIG. 11 is a partial cross-sectional view showing another prior art sunroof.
Figure 12:
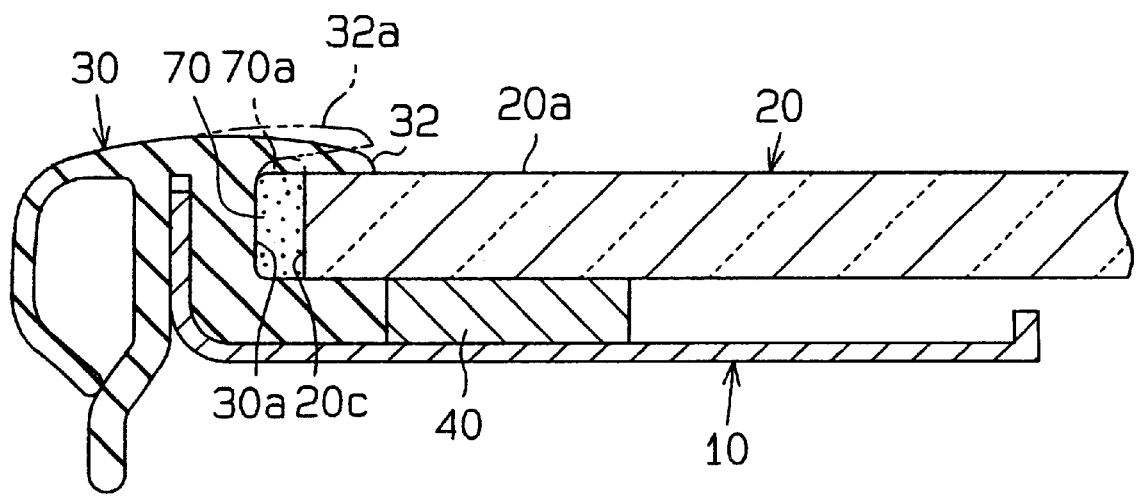
FIG. 12 is a partial cross-sectional view showing yet another prior art sunroof.

A fifth embodiment of the present invention will now be described with reference to FIG. 8. The differences from the embodiment of FIG. 5 will mainly be discussed below. In the embodiment of FIG. 8, the distal end 35a of the inner lip 35 is bent upward. Therefore, when attaching the weather strip 30 to the panel frame 10 from above, the distal end 35a of the inner lip 35 does not interfere with the edge of the panel 20 but is smoothly guided by the panel end face 20c. Therefore, the weather strip 30 is easily and accurately attached to the panel frame 10.

It should be apparent to those skilled in the art that the present invention may be embodied in many other specific forms without departing from the spirit or scope of the invention. Particularly, it should be understood that the invention may be embodied in the following forms.

The elastic material 50 may fully fill the gap S such that there is no empty space between the material 50 and the upper lip 32. In this embodiment, if the panel 20 thermally expands, the material 50 is pressed downward and does not cause the upper lip 32 to move upward. Since the material 50 closely contacts the entire panel end face 20c, foreign matter entering between the upper lip 32 and the panel upper surface 20a cannot reach the panel end face 20c. Normally, the panel end face 20c is not covered with a protection coat layer. If exposed to liquids such as detergent or wax, the uncoated end face 20c will be damaged. If the material 50 contacts the entire end face 20c, the chemical effect of such liquids on the panel end face 20c is completely eliminated. In the embodiments of FIGS. 1 to 4, 6 and 7, the material 50 contacts almost the entire end face 20c. Therefore, the chemical effect of foreign liquids on the panel end face 20c is almost completely eliminated.

The panel 20 need not be made of resin but may be made of glass. Although not as great as a case of a resin panel and a metal panel frame, there is a difference of coefficient of the linear expansion between a glass panel and a metal panel frame. Therefore, applying the present invention to the glass panel attaching structure is effective.

The present invention is not limited to a vehicle sunroof but may be applied to the panel attaching structure of any movable panels such as slide panels and tilt panels. Also, the present invention is not limited to movable panels but may be embodied in a panel that is fixed to an opening.

Therefore, the present examples and embodiments are to be considered as illustrative and not restrictive and the invention is not to be limited to the details given herein, but may be modified within the scope and equivalence of the appended claims.

What is claimed is:

1. A panel attaching structure comprising:
a generally horizontal frame,
a panel attached on the frame to move relative to the frame, wherein the panel includes an upper surface, a lower surface and an end surface, wherein the lower surface is adhered to the frame by adhesive,
a weather strip attached to the frame, wherein the weather strip contacts the upper surface to seal the periphery of the panel;
an opposing surface facing the end surface, wherein a gap is defined between the opposing surface and the end surface, and the gap becomes wider in a downward direction; and
a cohesive elastic material located in the gap and being spaced apart from the adhesive so that the elastic material, the adhesive, the lower surface of the panel, and the frame define a void, wherein, when the panel thermally expands, the elastic material is deformed to enter the void.

2. The panel attaching structure according to claim 1, wherein the end surface includes a surface inclined by an acute angle relative to the upper surface.

3. The panel attaching structure according to claim 1, wherein the end surface is substantially perpendicular to the upper surface, and wherein the opposing surface is inclined relative to the end surface.

4. The panel attaching structure according to claim 1, wherein the opposing surface is a surface of at least one of the frame and the weather strip.

5. The panel attaching structure according to claim 1, wherein the weather strip includes a lip extending into the gap to hold the elastic material.

6. A panel attaching structure comprising:
a generally horizontal frame,
a panel supported on the frame to move relative to the frame, wherein the panel includes an upper surface, a lower surface and an end surface, wherein the lower surface is adhered to the frame by adhesive;
a weather strip attached to the frame, wherein the weather strip includes an upper lip, which contacts the upper surface to seal the periphery of the panel;
an opposing surface facing the end surface, wherein a gap is defined between the opposing surface and the end surface, and a cohesive elastic material is located in the gap, the elastic material being spaced apart from the adhesive material so that the elastic material, the adhesive, the lower surface of the panel, and the frame define a void, and
a diverting mechanism, wherein, when the panel thermally expands, the elastic material is compressed and deformed between the end surface and the opposing surface, and the diverting mechanism pushes the elastic material in a downward direction such that the elastic material enters the void.

7. The panel attaching structure according to claim 6, wherein the diverting mechanism includes a widening of the gap such that the width of the gap increases at locations closer to the lower surface.

8. The panel attaching structure according to claim 7, wherein the end surface includes a surface inclined by an acute angle relative to the upper surface.

9. The panel attaching structure according to claim 7, wherein the end surface is substantially perpendicular to the upper surface, and wherein the opposing surface is inclined relative to the end surface.

10. The panel attaching structure according to claim 6, wherein the opposing surface is a surface of at least one of the frame and the weather strip.

11. The panel attaching structure according to claim 6, wherein the weather strip includes a lip extending into the gap to hold the elastic material.

* * * * *